US008815185B1

(12) United States Patent  
Bhaduri et al.

(10) Patent No.: US 8,815,185 B1
(45) Date of Patent: Aug. 26, 2014

(54) RECOVERY OF VANADIUM FROM PETROLEUM COKE SLURRY CONTAINING SOLUBILIZED BASE METALS

(71) Applicants: Rahul Shankar Bhaduri, Moraga, CA (US); Lawrence Paul Zestar, Lafayette, CA (US)

(72) Inventors: Rahul Shankar Bhaduri, Moraga, CA (US); Lawrence Paul Zestar, Lafayette, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/784,325

(22) Filed: Mar. 4, 2013

(51) Int. Cl.
*C01G 31/00* (2006.01)
*C22B 34/22* (2006.01)

(52) U.S. Cl.
CPC .................................. *C22B 34/225* (2013.01)
USPC ............................................................ 423/67

(58) Field of Classification Search
None
See application file for complete search history.

(56) References Cited

U.S. PATENT DOCUMENTS

| | | | |
|---|---|---|---|
| 3,653,816 A | 4/1972 | Mathers et al. |
| 4,216,118 A | 8/1980 | Yoshida et al. |
| 4,243,639 A | 1/1981 | Haas et al. |
| 4,382,068 A | 5/1983 | Rokukawa |
| 4,420,464 A | 12/1983 | Barclay |
| 4,443,415 A | 4/1984 | Queneau et al. |
| 4,536,374 A | 8/1985 | McCorriston |
| 4,554,138 A | 11/1985 | Marcantonio |
| 4,849,189 A | 7/1989 | Jansz |
| 5,702,500 A | 12/1997 | Llanos et al. |
| 6,180,072 B1 | 1/2001 | Veal et al. |
| 6,231,640 B1 | 5/2001 | Malone et al. |
| 6,235,253 B1 | 5/2001 | Holcombe et al. |
| 6,241,806 B1 | 6/2001 | Malone et al. |
| 6,333,012 B1 | 12/2001 | Akahoshi et al. |
| 7,214,309 B2 | 5/2007 | Chen et al. |
| 7,238,273 B2 | 7/2007 | Chen et al. |
| 7,375,143 B2 | 5/2008 | Kopponen et al. |
| 7,390,398 B2 | 6/2008 | Farshid et al. |
| 7,431,822 B2 | 10/2008 | Farshid et al. |
| 7,431,823 B2 | 10/2008 | Farshid et al. |
| 7,431,824 B2 | 10/2008 | Chen et al. |
| 7,485,267 B2 | 2/2009 | Marcantonio |
| 7,517,446 B2 | 4/2009 | Lott et al. |
| 7,578,928 B2 | 8/2009 | Lott et al. |
| 7,591,942 B2 | 9/2009 | Soled et al. |

(Continued)

FOREIGN PATENT DOCUMENTS

| | | |
|---|---|---|
| GB | 2456537 | 7/2009 |
| JP | 10152325 | 6/1998 |

(Continued)

OTHER PUBLICATIONS

PCT International Search Report, PCT/US2013/070725, mailed Feb. 17, 2014.

*Primary Examiner* — Melissa Swain
(74) *Attorney, Agent, or Firm* — Terrence Flaherty

(57) ABSTRACT

A method for recovering vanadium from a spent slurry catalyst for hydrocarbon oil hydroprocessing is disclosed. In one embodiment after de-oiling, the spent catalyst is treated with ammonia and air, forming a leach slurry. The leach slurry is subsequently treated with a flocculant. After solid-liquid separation to recover the solid residue containing coke and ammonium metavanadate, the solid residue is washed with an ammonium sulfate solution and leached with hot water. After solid-liquid separation to recover a solution containing ammonium metavanadate, the ammonium metavanadate is crystallized and purified from the leach solution.

13 Claims, 6 Drawing Sheets

(56) References Cited

U.S. PATENT DOCUMENTS

| | | |
|---|---|---|
| 7,658,895 B2 | 2/2010 | Bhaduri |
| 7,708,877 B2 | 5/2010 | Farshid et al. |
| 7,736,607 B2 | 6/2010 | Marcantonio |
| 7,737,068 B2 | 6/2010 | Powers et al. |
| 7,737,072 B2 | 6/2010 | Mironov et al. |
| 7,754,645 B2 | 7/2010 | Kuperman et al. |
| 7,790,646 B2 | 9/2010 | Lopez et al. |
| 7,815,870 B2 | 10/2010 | Lott et al. |
| 7,837,960 B2 | 11/2010 | Bhaduri et al. |
| 7,846,404 B2 | 12/2010 | Bhaduri et al. |
| 7,897,035 B2 | 3/2011 | Chabot |
| 7,897,036 B2 | 3/2011 | Chabot et al. |
| 7,897,537 B2 | 3/2011 | Pereira-Almao et al. |
| 7,901,569 B2 | 3/2011 | Farshid et al. |
| 7,947,623 B2 | 5/2011 | Mironov et al. |
| 7,955,497 B2 | 6/2011 | Abulnaga et al. |
| 8,080,154 B2 | 12/2011 | Odueyungbo |
| 8,080,155 B2 | 12/2011 | Da Costa et al. |
| 8,114,802 B2 | 2/2012 | Odueyungbo |
| 8,178,461 B2 | 5/2012 | Odueyungbo |
| 2006/0201854 A1 | 9/2006 | Lott |
| 2007/0025899 A1 | 2/2007 | Marcantonio |
| 2009/0023965 A1 | 1/2009 | Pereira et al. |
| 2009/0163347 A1 | 6/2009 | Shah et al. |
| 2009/0163348 A1 | 6/2009 | Da Costa et al. |
| 2010/0163499 A1 | 7/2010 | Odueyungbo |
| 2010/0199807 A1 | 8/2010 | Stiksma et al. |
| 2010/0294701 A1 | 11/2010 | Lott et al. |
| 2011/0005976 A1 | 1/2011 | Rispoli et al. |
| 2011/0176978 A1 | 7/2011 | Canelon et al. |
| 2012/0039777 A1 | 2/2012 | Bhaduri et al. |
| 2012/0134899 A1 | 5/2012 | Bartolini et al. |

FOREIGN PATENT DOCUMENTS

| | | |
|---|---|---|
| JP | 2005200231 | 7/2005 |
| JP | 2005298925 | 10/2005 |
| JP | 3883081 | 2/2007 |
| WO | 2011107802 | 9/2011 |

RECOVERY OF VANADIUM FROM PETROLEUM COKE SLURRY CONTAINING SOLUBILIZED BASE METALS

TECHNICAL FIELD

This disclosure relates to a process for separating and recovering vanadium from spent hydroprocessing catalyst.

BACKGROUND

Increasingly, heavy oil feedstocks such as heavy crude oils, bitumen, tar sands, shale oils, and hydrocarbons derived from liquefying coal are being utilized as hydrocarbon sources due to the decreasing availability of easily accessed light sweet crude oil reservoirs. These heavy oil feedstocks are disadvantaged relative to light sweet crude oils, containing significant amounts of heavy hydrocarbon fractions such as residue and asphaltenes, and often containing significant amounts of sulfur, nitrogen, metals (e.g., vanadium and nickel), and/or naphthenic acids. The concentration of metals in heavy oil feedstocks can vary from a few ppm up to 1,000 ppm or more, with a vanadium to nickel ratio of about 6:1.

The heavy oil feedstocks typically require a considerable amount of upgrading to at least partially convert heavy hydrocarbon fractions into lighter, more valuable hydrocarbons and/or to reduce the metals content, sulfur content, nitrogen content, and/or acidity of the feedstock. As a result, refiners are required to use more catalyst for hydroprocessing heavy oil feedstocks than lighter feedstocks.

A method to upgrade heavy oil feedstock is to disperse a slurry catalyst in the feedstock and pass the feedstock and slurry catalyst together with hydrogen through a slurry-bed, or fluid-bed, reactor operated at a temperature effective to crack heavy hydrocarbons in the feedstock and/or to reduce the sulfur content, nitrogen content, metals content, and/or the acidity of the feedstock. The feedstock and the slurry catalyst move together through the cracking reactor and are separated upon exiting the cracking reactor. Spent slurry catalyst can contain high amounts of metal (specifically, vanadium) and coke deposition.

With the increasing demand and market price for metal values and environmental awareness thereof, the large amount of spent catalysts generated in heavy oil upgrading can serve as a source for metals recovery. In particular, recovery of deposited vanadium is desirable as vanadium has a range of industrial uses.

There is still a need for improved methods to recover deposited metals, such as vanadium, from spent catalysts.

SUMMARY

In one aspect, there is provided a method for recovering vanadium from a spent slurry catalyst that has been used in hydroprocessing, the method comprising: (a) leaching the spent slurry catalyst with an ammonia-containing leach solution at a temperature and pressure sufficient to form an ammonia-leached slurry comprising at least a Group VIB soluble metal complex and at least a Group VIII soluble metal complex and a first solid residue; (b) contacting the ammonia-leached slurry with a flocculant to form a treated ammonia-leached slurry; (c) separating from the treated ammonia-leached slurry a second solid residue comprising coke, ammonium metavanadate and entrained Group VIB and VIII soluble metal complexes; (d) contacting the second solid residue with an ammonium sulfate solution to remove the entrained Group VIB and VIII soluble metal complexes from the second solid residue to form a treated second solid residue; (e) leaching the treated second solid residue with water at a temperature and a pressure sufficient to form an aqueous-leached slurry comprising soluble ammonium metavanadate and a third solid residue comprising coke having reduced vanadium content; (f) separating and removing the third solid residue from the aqueous-leached slurry to recover a filtrate comprising ammonium metavanadate; (g) crystallizing at least a portion of the ammonium metavanadate from the filtrate to form crystallized ammonium metavanadate; (h) washing the crystallized metavanadate with an aqueous ammonium metavanadate solution to form washed ammonium metavanadate; and (i) drying the washed ammonium metavanadate to form dried ammonium metavanadate.

DETAILED DESCRIPTION

Figure 1:
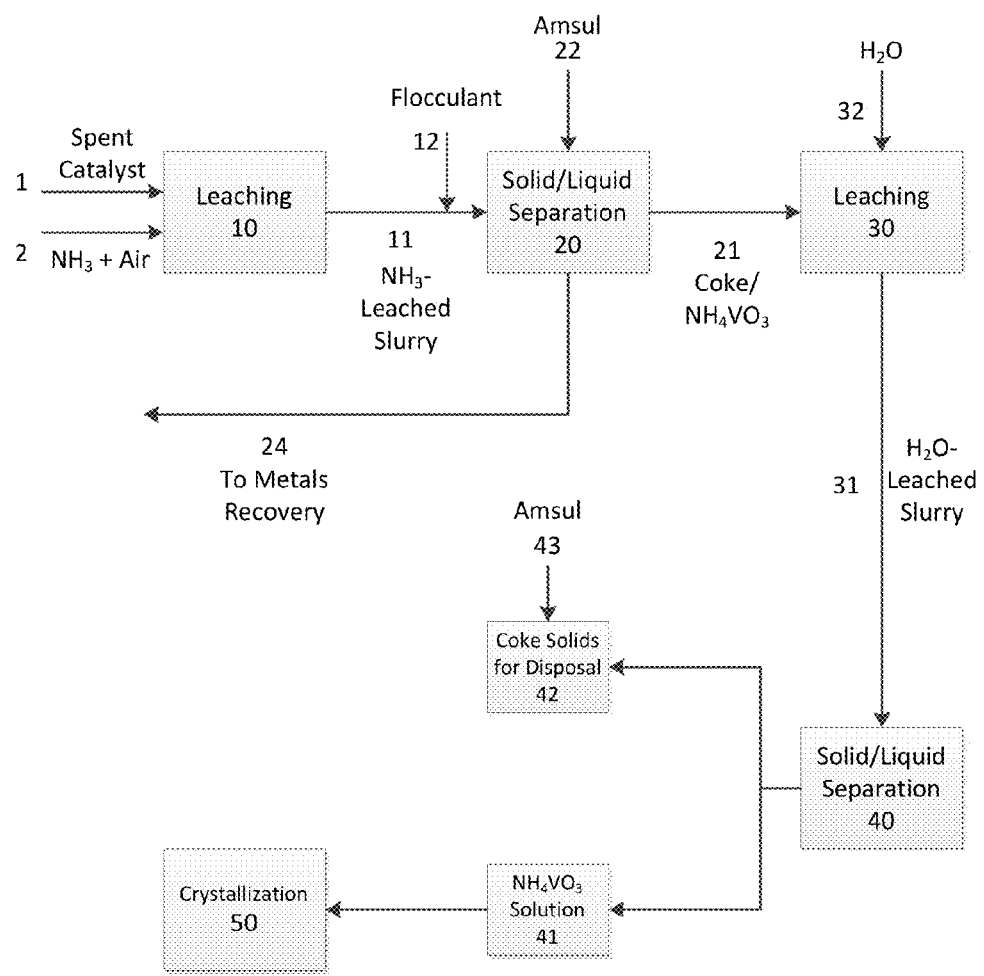
FIG. 1 is a block diagram illustrating one embodiment of a process to recover vanadium from spent catalyst.

The following terms will be used throughout the specification and will have the following meanings unless otherwise indicated.

"Spent catalyst" refers to a catalyst that has been used in a hydroprocessing operation and whose activity has thereby been diminished. For example, if the reaction rate constant of a fresh catalyst at a specific temperature is assumed to be 100%, the reaction rate constant for a spent catalyst temperature is 50% or less in one embodiment, and 30% or less in another embodiment. In one embodiment, the metal components of the spent catalyst comprise at least one of Group VB, VIB, and VIII metals (of the Periodic Table), e.g., vanadium (V), molybdenum (Mo), tungsten (W), nickel (Ni), and cobalt (Co).

The upgrade or treatment of heavy oil feeds can generally be referred herein as "hydroprocessing." Hydroprocessing refers to any process that is carried out in the presence of hydrogen, including, but not limited to, methanation, water-gas shift reactions, hydrogenation, hydrotreating, hydrodesulfurization, hydrodenitrogenation, hydrodemetallation, hydrodearomatization, hydroisomerization, hydrodewaxing, and hydrocracking including selective hydrocracking.

The reference to "vanadium" is by way of exemplification only for any Group VB metal component that can be present in spent catalysts and is not intended to exclude other Group VB metals/compounds and mixtures that can be present in the spent hydroprocessing catalyst.

The term "complex" is intended to include the definition defined by IUPAC that read as follows: "A molecular entity formed by loose association involving two or more component molecular entities (ionic or uncharged), or the corresponding chemical species. The bonding between the components is normally weaker than in a covalent bond." (IUPAC *Compendium of Chemical Terminology*, 2nd Edition, 1997).

The terms "flocculant" or "flocculating agent" mean a compound that attracts solid particles and aggregates the solids to prevent dispersion within a liquid medium.

When used herein, the Periodic Table of the Elements is the Table approved by IUPAC and the U.S. National Bureau of Standards, an example is the version published by CRC Press in the *CRC Handbook of Chemistry and Physics*, 88th Edition (2007-2008). The names for families of the elements in the Periodic Table are given here in the Chemical Abstracts Service (CAS) notation.

The term "ambient pressure" refers to pressures in the range of from 0.9 bar to 1.2 bar (90 kPa to 120 kPa).

The unit "ppm" refers to parts per million by volume. One ppm is equivalent to 1 mg per liter of solution (mg/L).

The unit "ppmw" refers to parts per million by weight. One ppmw is equivalent to 1 mg per kilogram of solution (mg/kg).

Spent Catalyst for Metal Recovery:

In one embodiment, the spent catalyst originates from a bulk unsupported Group VIB metal sulfide catalyst optionally promoted with at least a Promoter Metal selected from a Group VB metal such as vanadium (V) and niobium (Nb); a Group VIII metal such as nickel (Ni) and cobalt (Co); a Group VIII metal such as iron (Fe); a Group IVB metal such as titanium (Ti); a Group IIB metal such as zinc (Zn), and combinations thereof. Promoter Metals are typically added to a catalyst formulation to improve selected properties, or to modify the catalyst activity and/or selectivity. In another embodiment, the spent catalyst originates from a dispersed (bulk or unsupported) Group VIB metal sulfide catalyst promoted with a Group VIII metal for hydrocarbon oil hydroprocessing. In another embodiment, the spent catalyst originates from a Group VIII metal sulfide catalyst. In yet another embodiment, the spent catalyst originates from a catalyst consisting essentially of a Group VIB metal sulfide. In one embodiment, the spent catalyst originates from a bulk catalyst in the form of dispersed or slurry catalyst. In another embodiment, the bulk catalyst is a colloidal or molecular catalyst.

Further details regarding the catalyst wherefrom the spent catalyst originates are described in a number of publications, including, e.g., U.S. Pat. Nos. 7,947,623; 7,897,537; 7,754,645; 7,737,072; 7,591,942 and 7,578,928; and U.S. Patent Application Publication Nos. 2011/0005976; 2010/0294701; and 2009/0023965.

The bulk catalyst in one embodiment is used for the upgrade of heavy oil products as described in a number of publications, including, e.g., U.S. Pat. Nos. 7,901,569; 7,897,036; 7,897,035; 7,815,870; 7,708,877; 7,578,928; 7,517,446; 7,431,824; 7,431,823; 7,431,822; 7,390,398; 7,238,273; and 7,214,309; and U.S. Patent Application Publication Nos. 2010/0294701 and 2006/0201854.

In a hydroprocessing operation, a catalyst is typically deactivated with nickel and vanadium as "contaminants" in an amount ranging up to about 100 wt. % of the fresh catalyst weight. In some operations, due to the rapid coke deposition rate, the catalyst is deactivated prior to achieving its full metals adsorption capacity. Such catalysts are taken out of service when the spent catalyst contains as little as 10 wt. % nickel plus vanadium compounds.

In one embodiment, the spent catalyst is generally in the form of a dispersed suspension having an effective median particle size of from 0.01 to 200 microns (e.g., from 0.01 to 100 microns, or from 0.01 to 50 microns). In one embodiment, the spent catalyst has a pore volume of from 0.05 to 5 mL/g as determined by nitrogen adsorption.

Prior to metal recovery and after the heavy oil upgrade, the spent catalyst in one embodiment undergoes treatment for the removal of hydrocarbons such as oil, precipitated asphaltenes, other oil residues and the like. The spent catalyst prior to de-oiling contains carbon fines, metal sulfides, and (spent) unsupported slurry catalyst in unconverted resid hydrocarbon oil, with a solid content ranging from 5 to 50 wt. %. In one embodiment, the treatment is a de-oiling process which can include the use of solvent for oil removal, and a subsequent liquid-solid separation step for the recovery of de-oiled spent catalyst. In another embodiment, the treatment process further includes a thermal treatment step, e.g., drying and/or pyrolysis, for removal of hydrocarbons from the spent catalyst. In yet another embodiment, the de-oiling is with the use of a sub-critical dense phase gas, and optionally with surfactants and additives, to clean/remove oil from the spent catalyst.

In embodiments, the spent catalyst after de-oiling contains less than 5 wt. % hydrocarbons as unconverted resid, less than 2 wt. % hydrocarbons as unconverted resid, or less than 1 wt. % hydrocarbons as unconverted resid. The amount of metals to be recovered in the de-oiled spent catalyst depends on the compositional make-up of the catalyst for use in hydroprocessing, e.g., a sulfided Group VIB metal catalyst, a bimetallic catalyst with a Group VIB metal and a promoter Group VIII metal, or a multi-metallic catalyst with at least a Group VIB and at least a Promoter metal. In one embodiment, after the oil removal process, the spent catalyst containing metals for recovery is in the form of a coke-like material, which can be ground accordingly to a particle size ranging from 0.01 to 100 microns for the subsequent metal recovery process.

The de-oiling or removal of hydrocarbons from spent catalyst is disclosed in a number of publications, including, e.g., U.S. Pat. Nos. 8,178,461; 8,114,802; 8,080,155; 8,080,154; 7,790,646; 7,737,068; 7,375,143; and U.S. Patent Application Publication Nos. 2012/0134899; 2010/0163499; 2009/0163348; and 2009/0163347.

Metal Recovery

In one embodiment, the de-oiled catalyst first undergoes a pressure leaching process, wherein ammonia and air are supplied to induce a leaching reaction. Ammoniacal metal leaching is described in U.S. Pat. Nos. 7,846,404; 7,837,960; 7,737,068; 7,658,895; and 7,485,267. In one embodiment, the spent catalyst is first caustic leached under atmospheric pressure according to U.S. Pat. No. 6,180,072 before pressure leaching.

In one embodiment, the de-oiled and dried spent catalyst is leached in an autoclave, e.g., a multi-chambered, agitated vessel at a sufficient temperature and pressure, in which ammonia and air are supplied to induce leaching reactions, wherein metals such as Group VIB and Group VIII metals are oxidized and leached into solution forming soluble metal complexes. Most of the (incoming) Group VB metals (e.g., vanadium) in the spent catalyst is oxidized into a soluble form and precipitates onto the solid coke phase following discharge from the autoclave. In one embodiment, up to 10% of the incoming Group VB metal is leached into solution. For example, for a spent catalyst feed stream containing 0.5 wt. % V, up to 0.050 wt. % V ends up in the leach solution (based on the total weight of the feed stream).

In one embodiment, vanadium is converted into ammonium metavanadate, molybdenum is converted into molybdate compounds including ammonium orthomolybdate, and portions of nickel and cobalt (if any) are converted into amine complexes, e.g., cobalt amine sulfate, nickel amine sulfate, or the like, thereby being leached. In one embodiment, at least 70 wt. % of the Group VIB and the Group VIII metals are leached into solution. In another embodiment, at least 80 wt. % of the Group VIII metal is leached into solution and, in another embodiment, at least 90 wt. % of the Group VIB metal is leached into solution.

In one embodiment, the leaching is carried out at a pressure proportional to the temperature, e.g., a leach temperature of from 120° C. to 250° C. and autoclave pressure of from 100 to 1200 psig (0.69 to 8.27 MPa). In another embodiment, the autoclave pressure is from 300 to 800 psig (2.07 to 5.51 MPa). In one embodiment, the spent catalyst is pressure leached for from 60 to 360 minutes. In another embodiment, the pressure leach is for less than 240 minutes. In one embodiment, the pH of the leach solution is maintained within a range of 9 to 12 with sufficient amounts of ammonia to complex the nickel, molybdenum, vanadium and cobalt (if any). In one embodiment, the molar ratio of ammonia to nickel (plus any cobalt, if present) plus molybdenum plus vanadium is from 20:1 to 30:1. In one embodiment, the free ammonia concentration is maintained at greater than 1 wt. % (e.g., from 2 to 7 wt. %).

In one embodiment, the ammonia-leached slurry is treated with a flocculant at a temperature of 50° C. to 70° C. and for a sufficient time (e.g., from 10 to 60 minutes) to aggregate at least some of the suspended particles in the leach slurry. In one embodiment, the ammonia-leached slurry has a slurry density of from 1 to 20 wt. % solids (e.g., from 1 to 10 wt. % solids). The flocculant can be an inorganic salt. The flocculant can be a cationic polymer, an anionic polymer, or mixtures thereof. In one embodiment, the flocculant is a cationic polymer. In one embodiment, the cationic polymer is a cationic polyacrylamide. In embodiments, the flocculant is dosed at a concentration of from 1 to 1000 ppmw (e.g., from 1 to 100 ppmw, from 1 to 50 ppmw, from 1 to 25 ppmw, from 3 to 15 ppmw, or from 3 to 10 ppmw).

In one embodiment, the treated leach slurry is subjected to liquid-solid separation via methods known in the art, e.g., settling, centrifugation, decantation, or filtration using a vertical type centrifugal filter or a vacuum filter or a plate and frame filter, and the like, generating a liquid stream containing the Group VIB and Group VIII metal complexes together with a small amount of Group VB metal complexes (up to 10 wt. % of the incoming Group VB metal) and a solid residue comprising coke and Group VB metal complexes (up to 90 wt. % of the incoming Group VB metal), e.g., ammonium salts of vanadium such as ammonium metavanadate ($NH_4VO_3$).

In one embodiment, liquid-solid separation is carried out in a filtration device, to recover a filter cake containing $NH_4VO_3$ precipitate and coke as a solid residue. In embodiments, the filter cake contains from 35 to 65 wt. % solids (e.g., from 45 to 55 wt. % solids). In one embodiment, the liquid (filtrate or pressure leach solution stream) contains from 10 to 100 g/L Mo, from 1 to 20 g/L Ni, and from 0.05 to 2.0 g/L V. In one embodiment, the filtrate is subjected to further processing to recover the Group VIB and Group VIII metals by known means.

In one embodiment, after liquid-solid separation and during the cake washing step, the wet filter cake is treated with hot aqueous ammonium sulfate ("Amsul") solution, e.g., at about 55° C., to suppress ammonium metavanadate dissolution and to remove at least a portion of other entrained base metal contaminants, such as Mo and Ni, from the filter cake. In one embodiment, the weight ratio of Amsul solution to wet filter cake is from 1:1 to 10:1 (e.g., from 1:1 to 5:1).

In one embodiment, a sufficient amount of hot water, e.g., at about 80° C., is added to "re-pulp" the washed and wet filter cake, containing from 40 to 60 wt. % moisture, to a slurry density of from 15 to 30 wt. % solids (e.g., from 20 to 25 wt. % solids).

In embodiments, at least 70 wt. % of the ammonium metavanadate is leached into solution (e.g., at least 80 wt. % or at least 90 wt. % of the ammonium metavanadate is leached into solution). In one embodiment, the re-pulped filter cake is leached for from 30 to 360 minutes. In one embodiment, hot water leaching is conducted at a temperature of from 50° C. to 100° C. and at ambient pressure.

In one embodiment, the vanadium rich hot slurry is subjected to liquid-solid separation via methods known in the art, generating a liquid stream containing ammonium metavanadate and a solid residue comprising vanadium-depleted coke. In one embodiment, the liquid-solid separation is carried out in a filtration device, giving a vanadium-depleted coke as a solid residue and a liquid containing ammonium metavanadate. In one embodiment, the liquid (filtrate) has a vanadium content of up to 10,000 mg/L. In one embodiment, the filtrate has a vanadium content of from 1,000 to 10,000 mg/L, and from 5,000 to 10,000 mg/L in another embodiment.

In one embodiment, the vanadium-depleted coke is washed with a 0.5 wt. % ammonium sulfate solution at 80° C. at a 2:1 wash ratio (weight of amsul solution to weight of final washed wet filter cake). The presence of small amounts of ammonium sulfate is required during the washing step to mitigate fines migration into clustered moisture pockets, as a result of depletion of soluble ionic species in the cake.

In one embodiment after the hot water leaching reaction and liquid-solid separation step, ammonium metavanadate is precipitated from the solution via methods known in the art. In one embodiment, ammonium metavanadate is precipitated from the filtrate by evaporative crystallization. In one embodiment, evaporative crystallization is carried out using a rotary evaporator at a temperature of from 50° C. to 90° C. and at a pressure of from 0.5 to 10 psia (3.4 to 69.0 kPa).

After precipitation, the solid ammonium metavanadate can be separated from the solution by known means including settling, filtration, decantation centrifugation, etc., or combinations thereof.

In one embodiment after crystallization, the crystallized impure ammonium metavanadate is washed with a hot high purity aqueous ammonium metavanadate solution, e.g., at about 80° C., to form washed ammonium metavanadate crystals. In one embodiment, the aqueous high purity ammonium metavanadate solution has a vanadium content of from 15,000 to 25,000 mg/L. In embodiments, the weight ratio of the aqueous ammonium metavanadate solution to the crystallized ammonium metavanadate is from 5:1 to 25:1 (e.g., 10:1 to 20:1). In one embodiment, the unwashed and dried ammonium metavanadate crystals have a vanadium content of up to 350,000 mg/L. In embodiments, the unwashed ammonium metavanadate has a vanadium content of from 20,000 to 350,000 mg/L (e.g., from 20,000 to 300,000 mg/L, from 20,000 to 250,000 mg/L, from 20,000 to 200,000 mg/L, from 100,000 to 350,000 mg/L, or from 100,000 to 250,000 mg/L).

In one embodiment, the washed ammonium metavanadate crystals are subsequently dried. The drying step can be performed at atmospheric pressure or under vacuum. In one embodiment, the dried ammonium metavanadate has a vanadium content of up to 435,000 mg/L. In embodiments, the dried ammonium metavanadate has a vanadium content of from 200,000 to 435,000 mg/L (e.g., from 250,000 to 435,000 mg/L from 300,000 to 435,000 mg/L, or from 350,000 to 435,000 mg/L).

In one embodiment, the dried ammonium metavanadate is calcined in steam, air or inert gas at temperatures ranging from 200° C. to 800° C. for periods of time ranging from 1 to 48 hours, or more to form vanadium oxide ($V_2O_5$).

FIG. 1 is a block diagram illustrating an embodiment of a process to recover vanadium from spent hydroprocessing catalyst. The process as shown comprises a number of processing steps, with one or more of the steps operating in a batch flow mode, a sequential mode, or a continuous flow mode having a continuous or periodic inflow of feed.

De-oiled spent catalyst 1 is first leached in autoclave 10, e.g., a multi-chambered, agitated vessel, in which ammonia and air 2 are supplied to induce leaching reactions. After leaching, the ammonia-leached slurry 11 is depressurized and mixed with a flocculant 12 prior to a solid-liquid separation step 20. A moist solid residue containing coke, ammonium metavanadate ($NH_4VO_3$) and entrained Mo and Ni soluble complexes is treated with an aqueous ammonium sulfate solution (Amsul) 22 in the separator 20. A filtrate 24 containing soluble molybdenum and nickel complexes, ammonium sulfate and minor amounts of soluble ammonium metavanadate is recycled elsewhere in the circuit for metals recovery. The Amsul-treated solid residue 21 containing coke and ammonium metavanadate is discharged from the separator 20 and leached in reactor 30, in which hot water 32 is supplied to induce the dissolution reaction. After leaching, the water-leached slurry 31 is subjected to a solid-liquid separation step 40 and washing of the vanadium depleted residue 42 with a hot solution of Amsul 43. An aqueous ammonium metavanadate solution 41 is recovered from separator 40. Ammonium metavanadate is subsequently precipitated from solution 41 in crystallization step 50.

EXAMPLES

The following illustrative examples are intended to be non-limiting.

Example 1

Flocculant Added During $NH_4VO_3$-Coke Slurry Filtration

A Ni—Mo slurry catalyst (as described in U.S. Pat. Nos. 7,737,072 and 7,737,073) was used in a heavy oil upgrade process as described in U.S. Pat. No. 7,390,398. The spent catalyst underwent a de-oiling step similar to the procedures described in U.S. Pat. No. 7,790,646, generating a de-oiled solids coke product containing metal sulfides. The coke containing appreciable quantities of Mo, Ni, and V sulfides was subjected to ammoniacal pressure leaching under conditions disclosed in U.S. Pat. Nos. 7,485,267; 7,658,895 7,846,404; and 7,837,960. Following depressurization and cooling to about 60° C., the pressure leached discharge slurry containing about 5 wt. % solids was flash mixed with 5 ppm of a high cationic activity flocculant (Drewfloc™ 2490, Ashland Inc.) for about 30 seconds followed by slow mixing for about 15 minutes at temperature. The fine particulate coke, at a $P_{80}$ of 5 microns, formed large floccules that agglomerated into a coarse spongy residue.

Figure 2:
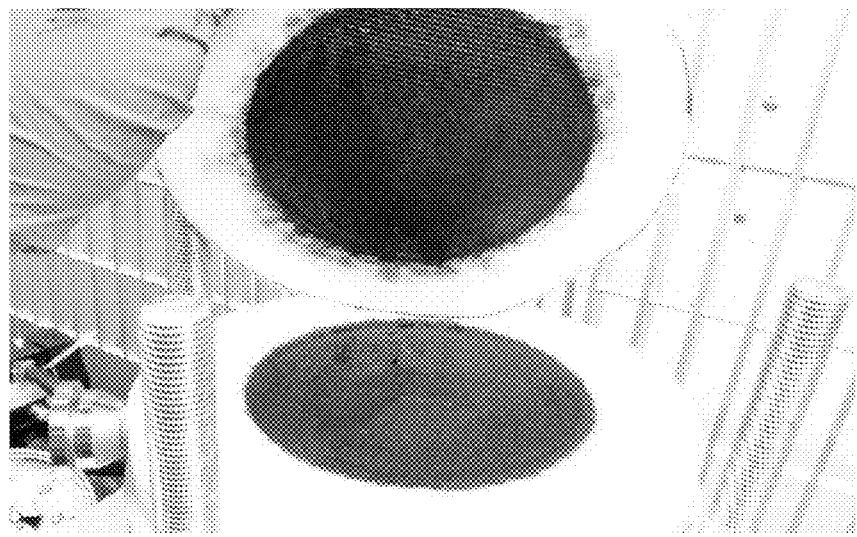
FIG. 2 shows filter cake upper cloth release following ammonium sulfate (Amsul) wash according to Example 1.
Figure 3:
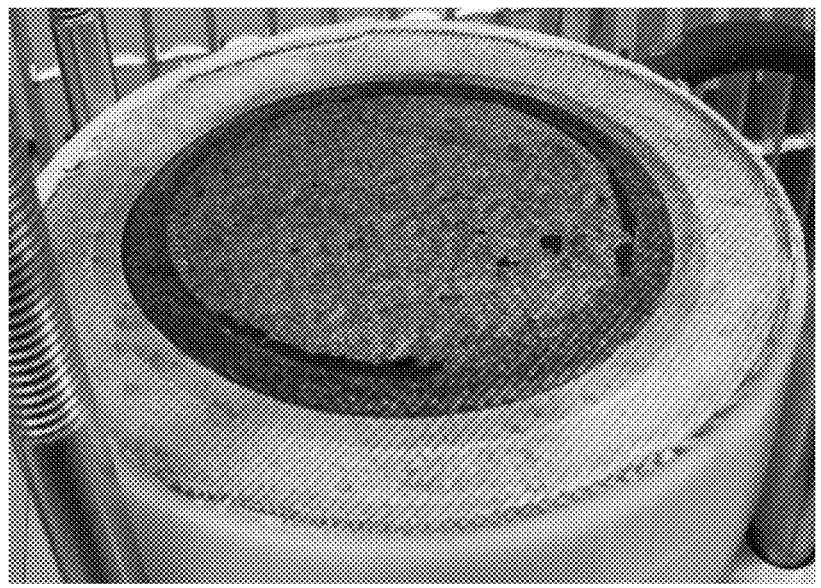
FIG. 3 shows filter cake lower cloth release following Amsul wash according to Example 1.
Figure 4:
FIG. 4 shows the consolidated filter cake obtained according to Example 1.

The hot slurry was pumped into a filter press at 55° C. and 90 psig via a diaphragm pump into a 33 mm filtration chamber capable of producing a target cake thickness of about 25 mm. Following an air pressing sequence for 1 minute at 90 psig on the moist solids, the cake was washed with hot 2 wt. % or 5 wt. % ammonium sulfate solution at an approximate wash ratio of 3:1 (weight of Amsul solution to weight of washed wet filter cake). A second air pressing sequence at 200 psig was initiated for 1 minute to remove excess entrained moisture from the cake, prior to an air drying sequence for 3 minutes at 60 psig. The filter cake was dumped from the press following air drying. FIGS. 2 and 3 depict a clean separation of the filter cloth from the moist cake. FIG. 4 depicts the physical characteristics of the consolidated filter cake.

Example 2

No Flocculant Added During $NH_4VO_3$-Coke Slurry Filtration

Figure 5:
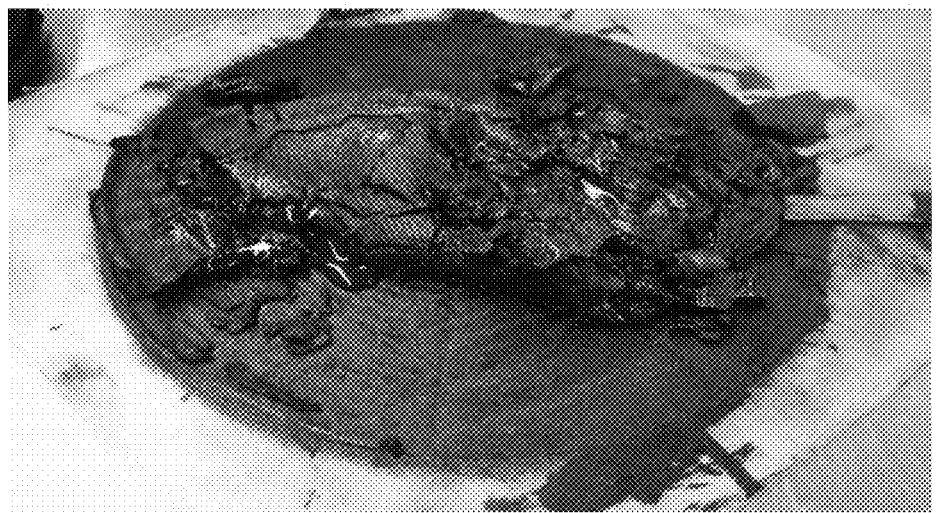
FIG. 5 shows the consolidated filter cake obtained according to Example 2.

Example 1 was repeated except that no flocculant was added. FIG. 5 depicts the physical characteristics of the consolidated filter cake which shows significant moisture retention in globular pockets of coke fines.

Examples 3-12

Slurry Filterability

Two different types of spent catalyst pressure leached slurries were tested for filterability at various dosages of a flocculant (Drewfloc™ 2490, Ashland Inc.). The results are set forth in Table 1.

TABLE 1

| | Amount of Flocculant Added (ppm) | Operation Time (min) | Total Wash Ratio | Overall Solution Flux Rate (Lpm/m$^2$) | Filter Cake Thickness (mm) |
|---|---|---|---|---|---|
| | | | Slurry-1 | | |
| Ex. 3 | 0 | 35 | 2.3 | 5.5 | 19.3 |
| Ex. 4 | 50 | 19 | 2.1 | 9.6 | 19.8 |
| Ex. 5 | 80 | 19 | 2.3 | 9.8 | 23.4 |
| | | | Slurry-2 | | |
| Ex. 6 | 0 | 35 | 3.3 | 7.7 | 26.5 |
| Ex. 7 | 2.5 | 26 | 3.3 | 9.5 | 23.9 |
| Ex. 8 | 3 | 29 | 3.2 | 8.4 | 23.5 |
| Ex. 9 | 10 | 26 | 3.1 | 9.6 | 25.3 |
| Ex. 10 | 15 | 26 | 2.9 | 9.3 | 26.2 |
| Ex. 11 | 25 | 26 | 2.6 | 9.4 | 25.2 |
| Ex. 12 | 50 | 27 | 2.7 | 9.1 | 26.0 |

As shown, in general for both slurries, increasing flocculant dosage as a function of cake thickness resulted in overall solution flux rate enhancement.

Species Removal from Slurry

Species removal from the filter cakes of Examples 6-12 following a hot Amsul wash were examined at various dosages of flocculant. The results are set forth in Table 2.

TABLE 2

| Slurry-2 | Amount of Flocculant Added (ppm) | Amsul (wt %) | Total Wash Ratio | Species Removal | | | |
|---|---|---|---|---|---|---|---|
| | | | | Mo | Ni | V | Amsul |
| Ex. 6 | 0 | 2 | 3.3 | 98.1% | 99.0% | 15.5% | 92.0% |
| Ex. 7 | 2.5 | 2 | 3.3 | 98.6% | 92.8% | 13.1% | 93.1% |
| Ex. 8 | 3 | 5 | 3.3 | 94.1% | 97.5% | 12.3% | 95.2% |
| Ex. 9 | 10 | 5 | 3.1 | 97.0% | 92.6% | 12.0% | >99.0% |

TABLE 2-continued

| Slurry-2 | Amount of Flocculant Added (ppm) | Amsul (wt %) | Total Wash Ratio | Species Removal | | | |
|---|---|---|---|---|---|---|---|
| | | | | Mo | Ni | V | Amsul |
| Ex. 10 | 15 | 5 | 2.9 | 85.1% | 84.6% | 10.0% | 92.2% |
| Ex. 11 | 25 | 5 | 2.6 | 53.8% | 50.3% | 10.6% | 76.0% |
| Ex. 12 | 50 | 5 | 2.7 | 57.2% | 49.4% | 8.6% | 74.6% |

As shown, higher concentrations of flocculant in the slurry (e.g., at 15 ppm of Ex. 10) in the slurry tend to impede removal of entrained species, such as Mo, Ni and Amsul, from the filter cake, that may be a result of co-adsorption of soluble metals into the porous spongy residue. The same phenomenon, albeit favorably, may be observed with V hold-up in the filter cake.

Elimination of polymer addition to the pressure leach slurry provided a vanadium-rich filter cake which exhibited thixotropic characteristics resulting in poor filter cloth removal and cake discharge.

Polymer addition at low dosage of between 3 ppm and 10 ppm in the filtration step alleviated the non-Newtonian characteristics of the filter cakes and also provided acceptable release of soluble entrained impurity metals from the solids phase into the wash filtrate while minimizing vanadium loss.

$NH_4VO_3$ Dissolution and Filtration from Filtered Coke Solids

The Amsul washed and filtered coke residue of Examples 6-12, each containing about 50 wt. % moisture, was repulped in hot (80° C.) water for 1 hour. The hot coke slurry containing solubilized vanadium was vacuum filtered through a 12 cm diameter Buchner funnel containing 20 micron pore Whatman filter paper. The yellow $NH_4VO_3$ filtrate was re-filtered hot through a 0.45 micron pore Whatman filter to ensure removal of coke fines. The vanadium-depleted cake was washed with hot water (80° C.) containing 0.5 wt. % Amsul at an approximate wash ratio of 2:1 (weight of Amsul solution to weight of washed wet filter cake). In excess of 90% vanadium was extracted into the solution phase together with varying amounts of molybdenum, nickel and Amsul (see Table 3).

TABLE 3

| Slurry-2 | Amount of Flocculant Added (ppm) | Amsul (wt %) | Total Wash Ratio | Species Extraction into Crystallizer Feed | | | |
|---|---|---|---|---|---|---|---|
| | | | | Mo | Ni | V | Amsul |
| Ex. 6 | 0 | 2 | 3.3 | 28.9% | <1% | 93.1% | 31.1% |
| Ex. 7 | 2.5 | 2 | 3.3 | 30.5% | 5.9% | 94.1% | 27.1% |
| Ex. 8 | 3 | 5 | 3.3 | 30.0% | 3.3% | 90.5% | 41.4% |
| Ex. 9 | 10 | 5 | 3.1 | 41.6% | 12.0% | 92.9% | 42.9% |
| Ex. 10 | 15 | 5 | 2.9 | 70.6% | 7.9% | 85.0% | 69.4% |
| Ex. 11 | 25 | 5 | 2.6 | 81.7% | 60.0% | 77.0% | 79.9% |
| Ex. 12 | 50 | 5 | 2.7 | 81.9% | 59.4% | 70.7% | 78.9% |

As a result of entrainment of impurity metals (e.g., Mo, Ni) at higher polymer concentrations (e.g., at 15 ppm of Ex. 10) during slurry filtration, higher concentrations of these metals were subsequently released into solution during the $NH_4VO_3$ dissolution step from coke.

Figure 6:
FIG. 6 shows a vanadium-depleted filter cake without Amsul addition.

During hot water washing of the V depleted coke, to liberate residual entrained vanadium, small amounts of Amsul (about 0.5 wt. %) addition was required; the non-Newtonian flow characteristics of the V depleted cake, or fines migration into moisture pockets, was exacerbated by depletion of soluble ionic species from the solids phase. The presence of small amounts of ammonium sulfate (e.g., 0.5 wt. %) was therefore de rigueur during washing of the V depleted residue to mitigate cake thixotropicity; FIG. 6 portrays an ostensibly consolidated V depleted filter cake without Amsul addition.

$NH_4VO_3$ Crystallization and Washing

The $NH_4VO_3$ filtrate generated from the dissolution step, containing up to 10,000 mg/L of vanadium, was evaporated under reduced pressure using a rotary evaporator. The flask with contents was partially immersed in a waterbath at 80° C. and connected to a rotary evaporator unit under 5 psia (34.5 kPa) vacuum pressure. After about 60 minutes of rotovapping, the resulting moist $NH_4VO_3$ crystals were washed twice in-situ with a hot (80° C.) solution of pure $NH_4VO_3$ (20,000 mg/L) at a total wash ratio of 20:1 (weight of pure $NH_4VO_3$ solution to weight of washed and dried crystals). After the first hot rinse (10:1), the wash solution was decanted off and followed by a second hot rinse (10:1). The mother liquor containing high levels of vanadium and some impurities, such as Mo and Ni, may be recycled for further processing.

Table 4 depicts metal removal efficiencies following crystallization and washing of the impure $NH_4VO_3$ crystals with pure $NH_4VO_3$ solution. In most instances below 10 ppmw polymer dosage, $NH_4VO_3$ crystal purity in excess of 95% vanadium was achieved contingent upon soluble contaminant removal from the filter cake feed to the $NH_4VO_3$ dissolution sequence.

TABLE 4

| Sample ID | Polymer (ppmw) | Species Removal | | | | V Crystal Purity |
|---|---|---|---|---|---|---|
| | | Mo | Ni | S | Si | |
| Ex. 6 | 0 | 81.5% | >99% | >99% | 13.7% | 94.7% |
| Ex. 7 | 2.5 | 82.8% | >99% | >99% | 20.7% | 95.7% |
| Ex. 8 | 3 | 89.8% | >99% | >99% | 37.2% | 95.9% |
| Ex. 9 | 10 | 91.7% | >99% | >99% | 41.5% | 93.9% |
| Ex. 10 | 15 | 95.0% | 90.7% | >99% | 45.6% | 89.3% |
| Ex. 11 | 25 | 22.3% | 27.8% | >99% | >99% | 38.3% |

As shown, at all polymer dosages, S or Amsul was substantially eliminated from the washed crystals; Ni followed the same removal profile except at polymer dosage above 10 ppmw (Ex. 10 and Ex. 11). Mo removal was severely impeded at polymer dosage above 15 ppmw (Ex. 11). The crystallizer feed of Example 11, that exhibited significantly higher levels of Mo and Ni, resulted in a final ammonium metavanadate crystal product having notably lower V crystal purity. Silicon levels in the washed and dried $NH_4VO_3$ generally averaged less than 0.5 wt. % with the remaining impurities comprising molybdenum and nickel species.

Figure 7:
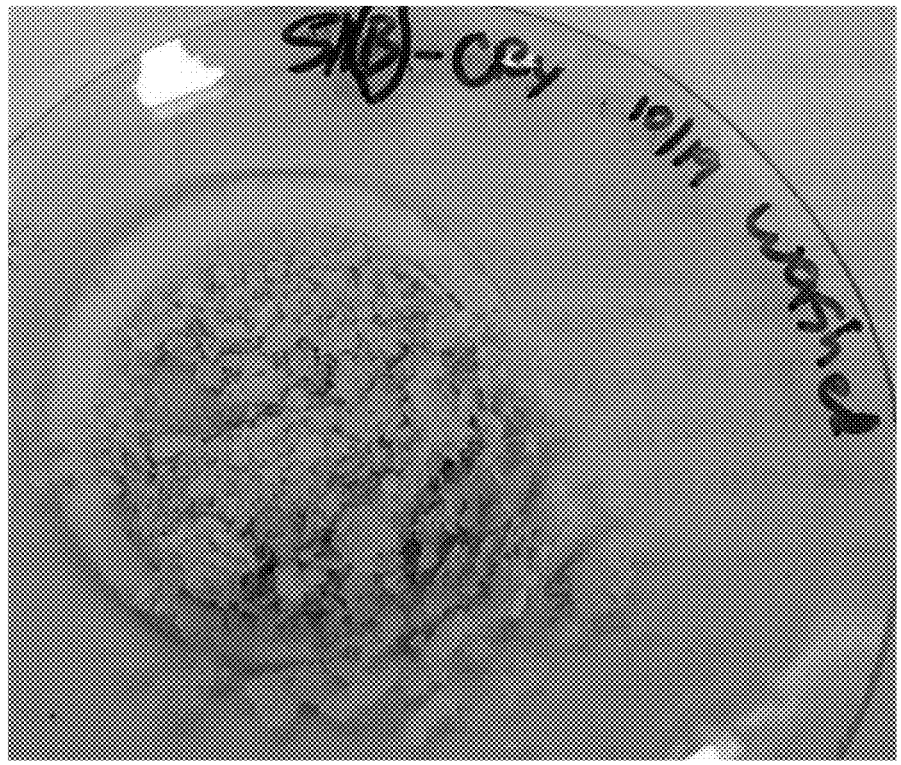
FIG. 7 shows the washed ammonium metavanadate crystals obtained after crystallization.
Figure 8:
FIG. 8 shows the dried ammonium metavanadate crystals obtained after crystallization.

The crystal slurry was subsequently filtered through a 0.45 micron pore Gelman magnetic micro-filtration vacuum unit. The resulting yellow platy structured crystals of moist ammonium metavanadate are depicted in FIG. 7. The moist crystals were dried overnight at 50° C. The dried ammonium metavanadate crystals are depicted in FIG. 8.

Figure 9:
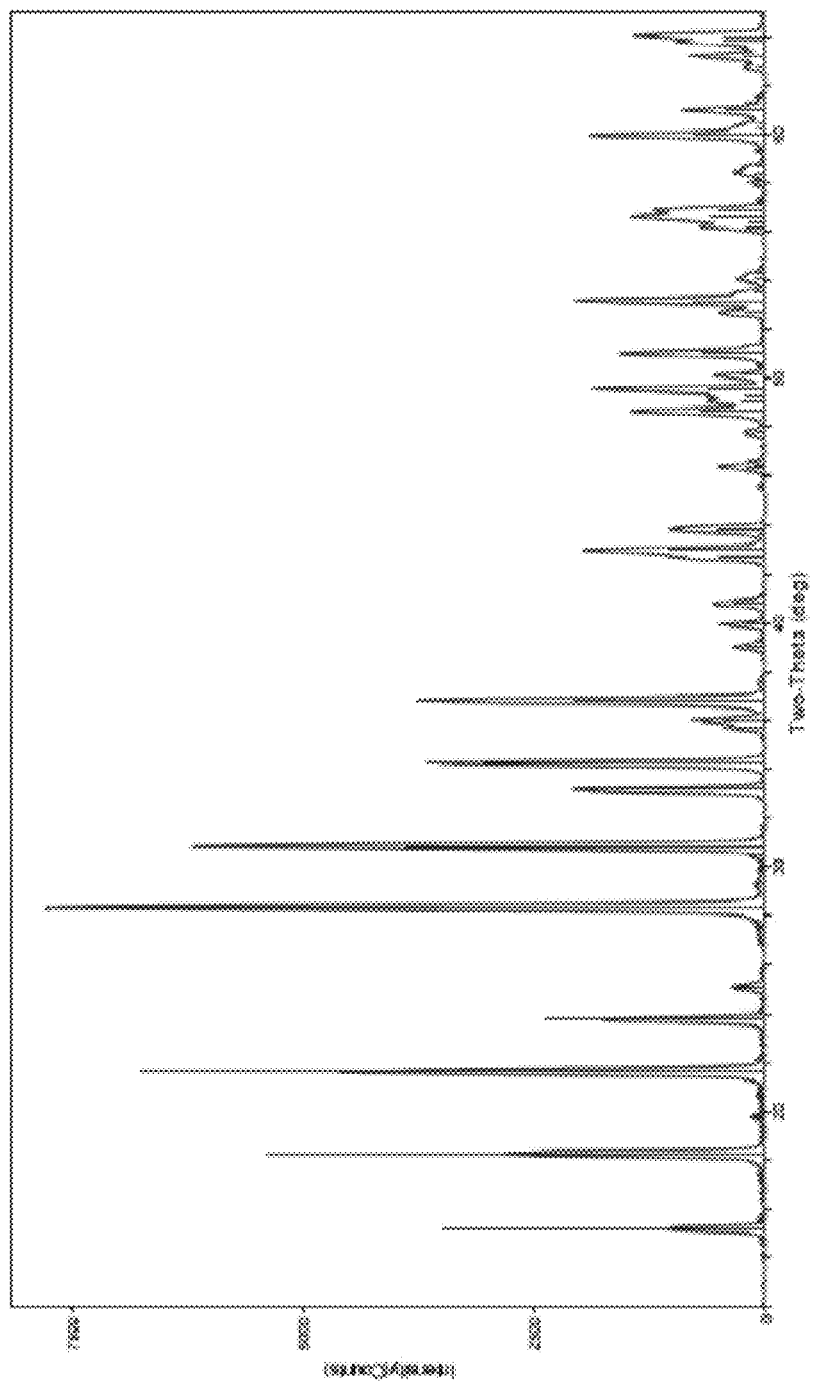
FIG. 9 shows a powder X-ray diffraction pattern of washed and dried ammonium metavanadate crystals obtained after crystallization.

FIG. 9 is an example of a powder X-ray diffraction (XRD) pattern of the washed and dried ammonium metavanadate obtained. The bars superimposed on XRD pattern represent reference peaks belonging to the $NH_4VO_3$ phase (index number 04-010-2778 from the International Centre for Diffraction Data powder diffraction database).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for recovering vanadium from a spent slurry catalyst that has been used in hydroprocessing, the method comprising:
    (a) leaching the spent slurry catalyst with an ammonia-containing leach solution at a temperature and pressure sufficient to form an ammonia-leached slurry comprising at least a Group VIB soluble metal complex and at least a Group VIII soluble metal complex and a first solid residue;
    (b) contacting the ammonia-leached slurry with a flocculant to form a treated ammonia-leached slurry;
    (c) separating from the treated ammonia-leached slurry a second solid residue comprising coke, ammonium metavanadate and entrained Group VIB and VIII soluble metal complexes;
    (d) contacting the second solid residue with an ammonium sulfate solution to remove the entrained Group VIB and VIII soluble metal complexes from the second solid residue to form a treated second solid residue;
    (e) leaching the treated second solid residue with water at a temperature and a pressure sufficient to form an aqueous-leached slurry comprising soluble ammonium metavanadate and a third solid residue comprising coke, the third solid residue having reduced vanadium content compared to the treated second solid residue;
    (f) separating and removing the third solid residue from the aqueous-leached slurry to recover a filtrate comprising ammonium metavanadate;
    (g) crystallizing at least a portion of the ammonium metavanadate from the filtrate to form a crystallized ammonium metavanadate;
    (h) washing the crystallized metavanadate of step (g) with an aqueous ammonium metavanadate solution to form a washed crystallized ammonium metavanadate; and
    (i) drying the washed crystallized ammonium metavanadate to form a dried crystallized ammonium metavanadate.

2. The method of claim 1, wherein the leaching of step (a) is conducted at a temperature of from 120° C. to 250° C. and at a pressure of from 100 to 1200 psig.

3. The method of claim 1, wherein the ammonia-leached slurry has a slurry density of from 1 to 20 wt. % solids.

4. The method of claim 1, wherein the flocculant is a cationic polymer.

5. The method of claim 1, wherein the flocculant is dosed at a concentration of from 3 to 15 ppmw.

6. The method of claim 1, wherein the weight ratio of the ammonium sulfate solution to the second solid residue is from 1:1 to 10:1.

7. The method of claim 1, wherein the leaching of step (e) is conducted at a temperature of from 50° C. to 100° C. and at ambient pressure.

8. The method of claim 1, wherein the filtrate has a vanadium content of from 1,000 to 10,000 mg/L of vanadium.

9. The method of claim 1, wherein ammonium metavanadate is crystallized from the filtrate by evaporative crystallization.

10. The method of claim 1, wherein the crystallized ammonium metavanadate of step (g) has a vanadium content of from 20,000 to 350,000 mg/L.

11. The method of claim 1, wherein the weight ratio of the aqueous ammonium metavanadate solution to the weight of the crystallized ammonium metavanadate is from 5:1 to 25:1.

12. The process of claim 1, wherein the aqueous ammonium metavanadate solution has a vanadium content of from 15,000 to 25,000 mg/L.

13. The method of claim 1, wherein the dried crystallized ammonium metavanadate has a vanadium content of from 300,000 to 435,000 mg/L.

* * * * *